United States Patent
Ishibashi

(10) Patent No.: US 6,211,112 B1
(45) Date of Patent: Apr. 3, 2001

(54) PHOTOCATALYST CARRIER AND MANUFACTURING METHOD THEREFOR

(75) Inventor: Yoshiaki Ishibashi, Tokyo (JP)

(73) Assignee: Junkosha Inc.

( * ) Notice: Subject to any disclaimer, the term of this patent is extended or adjusted under 35 U.S.C. 154(b) by 0 days.

(21) Appl. No.: 09/466,368

(22) Filed: Dec. 10, 1999

(30) Foreign Application Priority Data

Dec. 11, 1998 (JP) .................................................. 10-375164

(51) Int. Cl.[7] ...................................................... B01J 31/00
(52) U.S. Cl. ................. 502/159; 502/527.12; 502/527.15
(58) Field of Search ............................. 502/159, 527.12, 502/527.15

(56) References Cited

U.S. PATENT DOCUMENTS

| | | | |
|---|---|---|---|
| 5,256,616 | * 10/1993 | Heller et al. ......................... | 428/403 |
| 5,641,426 | * 6/1997 | Nerad et al. ..................... | 252/299.01 |
| 5,707,915 | * 1/1998 | Taoda ................................... | 502/349 |
| 5,981,425 | * 11/1999 | Taoda et al. ......................... | 502/208 |

FOREIGN PATENT DOCUMENTS 10-237431 * 10/1998 (JP) .

* cited by examiner

*Primary Examiner*—Elizabeth D. Wood
(74) *Attorney, Agent, or Firm*—Carol A. Lewis White

(57) ABSTRACT

A photocatalyst carrier is described, characterized in that the surface and/or pores of a hot-melt resin porous article is/are coated with a photocatalytic substance, and the system is heated to the softening temperature of the hot-melt resin to allow the photocatalytic substance to penetrate to some extent into the surface and/or pores of the hot-melt resin porous article, providing sufficient exposure to the surrounding atmosphere for the surface of the photocatalytic substance and supporting the substance on the hot-melt resin porous article with adequate bonding force.

11 Claims, No Drawings

PHOTOCATALYST CARRIER AND MANUFACTURING METHOD THEREFOR

BACKGROUND OF THE INVENTION

The present invention relates to a photocatalyst carrier for supporting a substance having a photocatalytic function (for example, titanium dioxide), and manufacturing method therefor.

DESCRIPTION OF RELATED ART

Conventionally known photocatalyst carriers include (1) those obtained by methods in which a porous membrane is impregnated with a stock solution of a photocatalytic particulate substance, and this stock solution is then subjected to a pulverization reaction; (2) those obtained by methods in which voids in a porous membrane are impregnated with a dispersion of a photocatalytic particulate substance, and the product is dried and supported; and (3) those obtained by methods in which a photocatalytic particulate substance is mixed, for example, with polytetrafluoroethylene (hereinafter "PTFE"), and is then made into a woven article after being calendered into a sheet or porosified and fibrillated.

Carriers obtained by methods in which a porous membrane is merely impregnated with a stock solution of a photocatalytic particulate substance, which is then subjected to a pulverization reaction, or carriers obtained by methods in which a photocatalytic particulate substance is directly supported by impregnation are disadvantageous, however, in that the photocatalytic substance and the porous membrane are not bonded together particularly strongly, and the photocatalytic substance tends to peel off. To address this problem, a method in which a photocatalytic particulate substance is tacked on to the surface of a PTFE porous membrane or the like, and this particulate substance is then compression-bonded with the PTFE porous membrane by being pressed with rolls is disclosed, for example, in Japanese Patent Application (Tokugan) 1-101342. In such a method, however, fixing is achieved by mechanical pressure alone, making it impossible to achieve sufficient bonding between the photocatalytic particulate substance and the PTFE porous membrane.

In addition, porous products made by premixing a photocatalytic particulate substance with a substrate resin such as PTFE develop strong bonding force between the photocatalytic particulate substance and the PTFE resin itself, but the surface of the photocatalytic particulate substance is not exposed adequately, and the resulting efficiency of the photocatalytic function is low. Furthermore, admixing large amounts of photocatalytic substances in order to raise the efficiency of the photocatalytic function tends to cause problems associated with a marked reduction in the mechanical strength of the PTFE porous article.

An object of the present invention is to provide a highly durable photocatalyst carrier in which sufficient exposure to the surrounding atmosphere is achieved for the surface of the photocatalytic substance on the surface and/or in the pores of a hot-melt resin porous article, optionally provided with a reticulated layer, and in which the photocatalytic substance is firmly supported by the photocatalytic substance.

SUMMARY OF THE INVENTION

According to the present invention, a substance having a photocatalytic function (such as titanium dioxide particles) is applied to a hot-melt resin porous article, and the article is then heated to the softening temperature of the resin surface, whereupon the pores of the hot-melt resin porous article shrink somewhat, and the surface softens at the same time, with the result that the applied titanium dioxide particles are supported by, and firmly bonded to, the hot-melt resin porous article while somewhat embedded in the pore walls.

Compared with cases in which the resin surface is merely coated with deposited titanium dioxide, therefore, the photocatalyst carrier pertaining to the present invention can develop a stronger bonding force, and the titanium dioxide can maintain its catalytic function for a long time with virtually no peeling or separation from the hot melt resin porous article, even under fairly rigorous service conditions.

In addition, when the hot-melt resin porous article that supports the aforementioned titanium dioxide is used in the form of a flat membrane, it is possible to fabricate a reticulated product with high mechanical strength, such as a photocatalyst-carrying sheet that is resistant to stretching or deformation and that is obtained by integrating a layer of glass fabric with the aid of a laminator. In the photocatalyst-carrying sheet thus fabricated, the photocatalytic substance remains resistant to peeling when stretched or the like. Another benefit is that in contrast to the mixing and molding of titanium dioxide and resins, large areas on the surface of the titanium dioxide are not penetrated into the resin, and thus, are exposed on the surface, making it possible to increase the surface area of the titanium dioxide functioning as a photocatalyst.

DETAILED DESCRIPTION OF PREFERRED EMBODIMENTS

The present invention will now be described in detail through specific embodiments.

A hot-melt resin porous article is used as the substrate for the photocatalyst carrier of the present invention. Using a fluororesin as the hot-melt resin is particularly preferred because of the need to afford oxidation resistance, taking into account the decomposition power of the active oxygen produced by titanium dioxide. Specific examples of resins that can be used as such hot-melt fluororesins include tetrafluoroethylene-hexafluoroethylene copolymers (FEP), tetrafluoroethylene-perfluoroalkyl vinyl ether copolymers (PFA), tetrafluoroethylene-hexafluoroethylene-perfluoroalkyl vinyl ether copolymers (EPA), and tetrafluoroethylene-ethylene copolymers (ETFE). In addition, the aforementioned hot-melt fluororesins, and PFA and FEP in particular, exhibit good transmission properties at a wavelength of 385 nm, which corresponds to the light (UV light) needed to achieve photocatalysis, and are thus suitable as such photocatalyst carrier substrates. Another feature of such hot-melt fluororesins is that their melt viscosity falls within a range of about 102 to 107 poise; that is, these resins behave similarly to common macromolecular materials and, unlike low-molecular substances, melt within a fairly wide temperature range, with the result that these resins can be adequately softened by heating without causing the collapse of the pores in the porous article.

A porous article used as a substrate can be obtained from the aforementioned fluororesin by a method in which hot-melt fluororesin particles and a thermoplastic resin soluble in organic solvents are heated to a temperature above the melting point of the thermoplastic resin soluble in organic solvents but below the melting point of the hot-melt fluororesin. Pressure and shearing force are optionally applied at the same time as heat is applied to perform molding. The system is subsequently heat-treated at a temperature above the melting point of the hot-melt fluororesin, and the resin soluble in organic solvent is then dissolved away with an organic solvent, yielding a hot-melt fluororesin porous article.

It is also possible to obtain a hot-melt fluororesin porous sheet reinforced with glass fabric by performing the following operations during the manufacturing steps. A sheet is first molded when the system is heated and molded at a temperature below the melting point of the hot-melt fluororesin, as described in the molding steps above. Glass fabric is then sandwiched and integrated between two such sheets, then this system is heat-treated at a temperature above the melting point of the hot-melt fluororesin, and the resin soluble in organic solvents is then dissolved away with an organic solvent. The pores and/or the surface of the porous article are/is coated with titanium dioxide by a method in which the resulting hot-melt fluororesin porous article, optionally reinforced with glass fabric, is impregnated with a solution obtained by dispersing fine titanium dioxide particles in water, and the system is then dried, or by a method in which a titanium compound serving as a starting material for fine titanium dioxide particles is caused to react directly with the aforementioned hot-melt fluororesin porous article by a sol-gel technique. The system is then heated to a temperature 30–80° C. below the melting point of the hot-melt fluororesin. The titanium dioxide deposited on the hot-melt fluororesin porous article is thereby held on the porous article by a strong bonding force. This is attributed to the fact that the surfaces and pore walls of the hot-melt fluororesin porous article are softened, and the entire pores are somewhat contracted to enclose the titanium dioxide such that the titanium dioxide that covers the surfaces and pores of the resin penetrates into the resin to a certain extent, demonstrating an anchoring effect and producing considerable bonding force. The corresponding temperature should therefore be set to the softening temperature of the resin surface. An excessively low temperature will make it impossible to support titanium dioxide on the resin with adequate bonding force, whereas an excessively high temperature will result in complete melting and will cause the pores to collapse. The temperature must therefore be selected such that surface softening is induced in the hot-melt fluororesin used.

As a result of being subjected to such a process, the titanium dioxide is supported with substantial bonding force on the hot-melt fluororesin porous article. In addition, the titanium dioxide has a wide exposure surface while penetrating only slightly into the pores or near the surface of the resin, so the surface area of the titanium dioxide having catalytic action can be utilized with high efficiency.

When the hot-melt fluororesin porous article is required to have particularly pronounced hydrophilic properties, it is possible to perform a hydrophilization treatment to provide such hydrophilic properties. In one preferred method, the aforementioned hot-melt fluororesin porous article, before being coated with titanium dioxide, is impregnated with a dispersion of fine particulate silicon dioxide or another inorganic substance having pronounced hydrophilic properties, then dried and heat-treated. In another method, a stock solution of a silicon dioxide powder substance is pulverized, and the resulting powder is impregnated into the article and bonded by a sol-gel technique to cover the aforementioned hot-melt fluororesin porous article with the silicon dioxide. In the particular case of ETFE being used as the substrate, applying silicon dioxide is effective not only for achieving better hydrophilic properties but also for preventing the ETFE from being corroded as a result of the strong photocatalytic action of titanium dioxide. The reason is that the ETFE is less likely to be directly affected by the titanium dioxide because of the presence of a silicon dioxide layer between the titanium dioxide and ETFE.

Apart from titanium dioxide, other examples of photocatalytic substances include zinc oxide, iron oxide, cadmium sulfide, cadmium selenide, and strontium titanate. These photocatalysts may be used singly or as combinations of two or more photocatalysts.

Aluminum oxide and zirconium oxide can be cited in addition to silicon dioxide as examples of the inorganic oxides used for the hydrophilization of the hot-melt fluororesin porous article, but any substance may be used as long as it has a hydrophilization function, is not affected by photocatalysis, and performs functions similar to those of the aforementioned silicon dioxide.

The photocatalyst carrier can be shaped as a flat membrane or a hollow yarn, and is not subject to any particular limitations as long it has a shape that can be assumed by the hot-melt fluororesin porous article used as the substrate.

In addition, the reticulated material used as reinforcement in the hot-melt fluororesin porous article is not limited to glass fabric and can be any material that is impervious to the photocatalytic action of titanium dioxide, has excellent mechanical strength, and can be laminated to the hot-melt fluororesin porous article. The location in which this material is provided can also be varied freely depending on the intended application.

Without intending to limit the scope of the present invention, the following examples illustrate how the present invention may be made and used:

EXAMPLE 1

The following two components were mixed at room temperature: 1.0 kg aqueous PFA dispersion (Dainion, PFA 6910N, solids: 23 wt %) and 8.2 kg of a 10-wt % acetone solution of a tetrafluoroethylene-vinylidene fluoride copolymer (Daikin Industries, Neoflon VDF, hereinafter "VDF"). The mixture was gelated, and the solids were taken out and dried. The solids were subsequently pelletized in a twin-screw extruder at a die temperature of 160° C. The resulting pellets were melt-extruded at a die temperature of 200° C. with the aid of a single-screw extruder equipped with a slit die at the tip, yielding a sheet with a thickness of about 0.14 mm.

The sheet was then calendered to about 70% of its original thickness by being passed through a roll press heated to about 160° C. As a result of these operations, the PFA particles in the ultimately obtained PFA porous article were somewhat fibrillated and made into a three-dimensional bonded reticulated structure. The sheet was subsequently kept for about 20 seconds in an electric oven at 320° C. and then dipped in acetone to dissolve away the VDF. The porous PFA sheet thus obtained had the above-described three-dimensional reticulated structure and possessed a porosity of 80% and a thickness of 0.1 mm.

A titanium dioxide dispersion (Tinoc CZG-221, manufactured by Taki Chemical, titanium dioxide with average particle size of several nanometers) was subsequently added in an amount of 400 g to a solution obtained by mixing 160 g water, 240 g isopropanol, and 5 g of a 1-wt % aqueous solution of a surfactant (FC-170C, manufactured by 3M), yielding Treatment Solution 1. The pores in the sheet were impregnated with the titanium dioxide dispersion either by immersing the porous PFA sheet in Treatment Solution 1 or spraying Treatment Solution 1 over the porous PFA sheet with a sprayer. The porous PFA sheet was subsequently dried with hot air (100° C. or less), washed with water, and re-dried. The resulting porous PFA sheet that supported titanium dioxide was kept at a temperature of 270–290° C. in an electric oven.

A porous PFA sheet that supported titanium dioxide was obtained in the manner described above, a product obtained by coating drawn porous PTFE with titanium dioxide by a sol-gel technique was used as a comparison sample, and the two products were tested by comparing the bonding forces with which the titanium dioxide was supported. In these tests, self-adhesive tape (cellophane tape) was pasted over the same surface area of the two products, and this self-adhesive tape was then peeled off to determine the degree to which titanium dioxide had adhered to the surfaces of the self-adhesive layers. As a result, no titanium dioxide had adhered to the surface of the self-adhesive layer on the self-adhesive tape peeled off from the porous PFA sheet that supported the titanium dioxide in Example 1 of the present invention. In contrast the entire surface of the self-adhesive layer was covered with titanium dioxide in the case of the self-adhesive layer on the self-adhesive tape peeled off from the product obtained in accordance with the comparative example by supporting titanium dioxide on stretched porous PTFE.

EXAMPLE 2

The following two components were mixed at room temperature: 1.6 kg aqueous PFA dispersion (Dainion, PFA 6910N, solids: 23 wt %) and 7.6 kg of a 10-wt % acetone solution of VDF. The mixture was gelated, and the solids were taken out and dried. The solids were subsequently pelletized in a twin-screw extruder at a die temperature of 160° C. The resulting pellets were melt-extruded at a die temperature of 200° C. with the aid of a single-screw extruder equipped with a slit die at the tip, yielding a sheet product which was subsequently molded into a sheet with a thickness of about 0.05 mm by being passed through a roll press heated to about 160° C.

Two sheets measuring about 10 cm by 20 cm were prepared, a piece of glass fabric (E Glass, manufactured by Arisawa Mfg.) with a thickness of 0.05 mm was sandwiched between these two sheets, and the components were then integrated using a press, where a pressure of about 5–10 MPa was applied in the thickness direction at a temperature of 220° C.

The integrated sheet was preheated for 1 minutes at 230° C. in a thermostat and then kept for 3 minutes at 300° C. The heat-treated integrated sheet was subsequently immersed in acetone to dissolve away the VDF.

The resulting porous PFA sheet provided with integrated glass fabric was impregnated with Treatment Solution 1 by the same method as described in Example 1, then dried with hot air (100° C. or lower), washed with water, and re-dried. The porous PFA sheet (having the integrated glass fabric and on which titanium dioxide was supported) was subsequently kept at a temperature of 270–290° C. in an electric oven.

The resulting porous PFA sheet (having the integrated glass fabric and on which titanium dioxide was supported) was an integrated laminate in which the upper and lower layers were porous PFA films having a porosity of 70%, and a piece of glass fabric was provided as an intermediate layer. The mechanical strength thereof, expressed as the longitudinal tensile strength in the planar direction, was 10 kgf per 25 mm of sheet width. As in Example 1, titanium dioxide was supported with substantial bonding force on the porous PFA provided with glass fabric.

EXAMPLE 3

A different mixing ratio was used for PFA, and a porous PFA sheet was fabricated by the same method as in Example 2. The sheet contained a piece of glass fabric and supported titanium dioxide. The PFA porous layer had a porosity of 60%.

EXAMPLE 4

A porous PFA sheet was impregnated with Treatment Solution 1 as a preliminary step, and was fabricated by the same method as in Example 2. The sheet contained a piece of glass fabric. The PFA porous layer had a porosity of 70%.

Methanol (7200 9) was added to 800 g of a silicon dioxide dispersion (Oscal, manufactured by Shokubai Kasei Kogyo, silicon dioxide 30 wt %-methanol), and 80 g of a surfactant (FC-170C, manufactured by 3M) was then added to the resulting solution, yielding Treatment Solution 2. The above-described porous PFA sheet provided with glass fabric was immersed in Treatment Solution 2, and the pores in the sheet were impregnated with silicon dioxide. The sheet was subsequently dried at 80° C. and heated to 150° C. to deposit the silicon dioxide on the porous PFA sheet provided with glass fabric.

The porous PFA sheet provided with glass fabric that supported silicon dioxide was impregnated with Treatment Solution 1 by the same method as in Example 1, dried with hot air (100° C. or lower), washed with water, and re-dried. The porous PFA sheet provided with glass fabric and impregnated with titanium dioxide (silicon dioxide was also supported on this sheet) was then kept at a temperature of 270–290° C. in an electric oven, yielding a porous PFA sheet (porosity: 70%) provided with glass fabric. Silicon dioxide and titanium dioxide were supported on this sheet.

The samples described with reference to Examples 2, 3, and 4 were measured for their photocatalytic effect. The measurement method entailed cutting the aforementioned three types of sheets into 30-cm$^2$ segments, immersing the segments in 30 ml of a 50-ppm aqueous solution of methylene blue, and irradiating the segments with UV light (UV light intensity: 30 mW/cm$^2$) for 1 hour. As a result, the concentration of methylene blue varied as shown in Table 1.

It can be seen in Table 1 that methylene blue was decomposed by the photocatalytic action of the titanium dioxide supported on the porous PFA sheet provided with glass fabric. It can also be seen that the sample of Example 2 decomposes more of the methylene blue than does the sample of Example 3, and that the effective surface area contributing to the photocatalytic action of the titanium dioxide is wider in the sample of Example 2 in proportion to the increased porosity. A comparison between Examples 2 and 4 also demonstrates that a sample that supports silicon dioxide decomposes a larger amount of methylene blue, indicating that the supported silicon dioxide makes it easier for the methylene blue aqueous solution to penetrate into the material and improves the decomposition efficiency.

TABLE 1

Results of Measuring Photocatalyzer Carrier Decomposed Methylene-blue

| Sample | Methylene-blue concentration (UV.1 hr irradiation) |
|---|---|
| Example 2 | 50 ppm → 12 ppm |
| Example 3 | 50 ppm → 20 ppm |
| Example 4 | 50 ppm → 9.5 ppm |

Table 2 shows the results of comparative measurements concerning the amount of moisture passing through the sheets in the samples of Examples 2 and 4. The measurement method entailed cutting each of the two types of sheets into 25-cm$^2$ segments and measuring moisture permeability by forcing water through the sheets at a pressure of 0.5 kgf. The results in Table 2 indicate that a porous PFA (porosity: 70%) sheet provided with glass fabric and coated with silicon dioxide and titanium dioxide has higher moisture permeability (despite the smaller pore diameters of the porous PFA layer) than a product coated with titanium dioxide alone, and in actual practice possesses better hydrophilic properties.

TABLE 2

Results of Measuring Water Permeation Rate of Photocatalyzer Carrier

| Sample | Water Permeation Rate cc/sec | Porous PFA Mean Pore Diameter μm |
|---|---|---|
| Example 2 | 0.08 | 1.5 |
| Example 4 | 1.95 | 1.26 |

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. An article comprising:
   at least one photocatalytic substance in the form of particles; and
   a photocatalyst carrier comprising a hot-melt resin porous article with a three-dimensional reticulated structure,
   whereby the photocatalytic particles penetrate into at least one of the surface and the pores of the three-dimensional reticulated structure, and are anchored by the hot-melt resin such that the resin encloses only a portion of each photocatalytic particle.

2. The article of claim 1, wherein the photocatalytic substance comprises titanium dioxide.

3. The article of claim 1, wherein the phtocatalytic substance comprises at least one material selected from the group consisting of zinc oxide, iron oxide, cadmium sulfide, cadmium selenide and strontium titanate.

4. The article of claim 1, wherein said at least one photocatalytic substance comprises a combination of two or more photocatalytic substances.

5. The article of claim 1, wherein said photocatalyst carrier comprises a hot-melt resin porous article selected from the group consisting of tetrafluoroethylene-hexafluoroethylene copolymers (FEP), tetrafluoroethylene-perfluoroalkyl vinyl ether copolymers (PFA), tetrafluoroethylene-hexafluoroethylene-perfluoroalkyl vinyl ether copolymers (EPA), and tetrafluoroethylene-ethylene copolymers (ETFE).

6. The article of claim 1, wherein said photocatalyst carrier further comprises a reticulated layer.

7. The article of claim 6, wherein said reticulated layer comprises a glass fabric.

8. The article of claim 1, wherein said photocatalyst carrier further comprises a hydrophilic component.

9. An article comprising:
   at least one photocatalytic substance comprising titanium dioxide particles; and
   a photocatalyst carrier comprising at least one hot-melt resin material selected from PFA and FEP having a reticulated material comprising glass fabric sandwiched within the photocatalyst carrier, whereby the titanium dioxide particles penetrate into and are anchored by the hot-melt resin such that the resin encloses only a portion of each photocatalytic particle.

10. The article of claim 9, further comprising a hydrophilic component comprising silicon dioxide particles coated onto the surface of the photocatalyst carrier.

11. A method for manufacturing a photocatalyst carrier comprising:
   applying a photocatalytic substance in the form of particles onto the surface of a carrier comprising at least one hot-melt resin porous material;
   heating the coated carrier to cause said hot-melt resin to soften, whereby a portion of each photocatalytic particle penetrates into the resin; and
   cooling said hot-melt resin so that said resin contracts around the photocatalytic particles and anchors the photocatalytic particles to the carrier.

* * * * *